Figure 3:
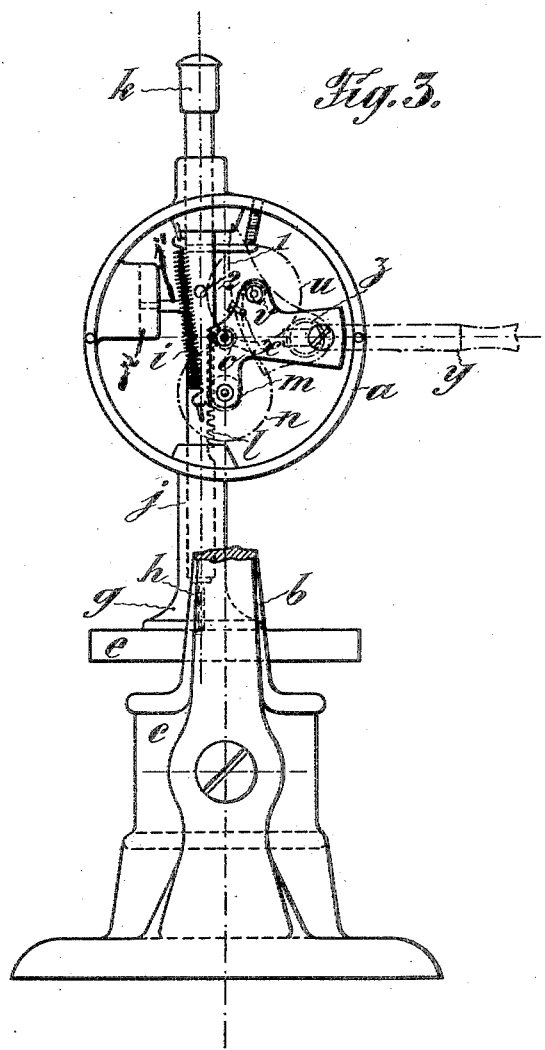

No. 802,470. PATENTED OCT. 24, 1905.
M. PICARD.
MEASURING INSTRUMENT DESIGNED TO ASCERTAIN THE DEPTH
OF RECESSES OR CAVITIES FORMED IN SOLID BODIES.
APPLICATION FILED JAN. 28, 1905.
2 SHEETS—SHEET 1.
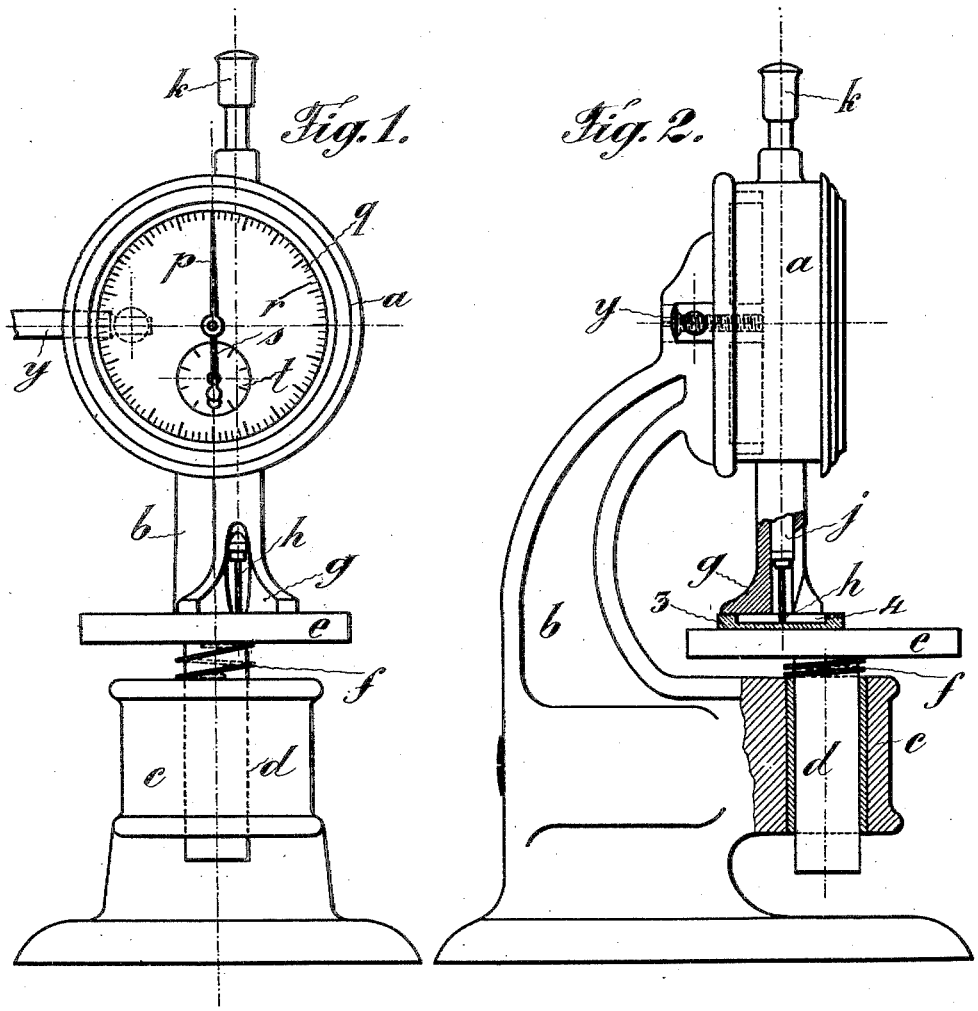
Witnesses:
John Schnelldorf
F. Heller
Inventor:
Maurice Picard
by B. Singer atty No. 802,470. PATENTED OCT. 24, 1905.
M. PICARD.
MEASURING INSTRUMENT DESIGNED TO ASCERTAIN THE DEPTH
OF RECESSES OR CAVITIES FORMED IN SOLID BODIES.
APPLICATION FILED JAN. 28, 1905.

UNITED STATES PATENT OFFICE.

MAURICE PICARD, OF LA CHAUX-DE-FONDS, SWITZERLAND.

MEASURING INSTRUMENT DESIGNED TO ASCERTAIN THE DEPTH OF RECESSES OR CAVITIES FORMED IN SOLID BODIES.

No. 802,470.     Specification of Letters Patent.     Patented Oct. 24, 1905.

Application filed January 28, 1905. Serial No. 243,106.

*To all whom it may concern:*

Be it known that I, MAURICE PICARD, a citizen of France, residing at 12 Rue Léopold Robert, La Chaux-de-Fonds, Switzerland, have invented new and useful Improvements in Measuring Instruments Designed to Ascertain the Depth of Recesses or Cavities Formed in Solid Bodies, of which the following is a specification.

My invention relates more particularly to measuring instruments designed to ascertain the depth of recesses or cavities formed in solid bodies.

My invention will be more fully described in connection with the accompanying drawings and will be more particularly pointed out in the appended claims.

In the drawings, Figure 1 represents in front elevation a measuring device embodying the main features of my invention. Fig. 2 is a view in side elevation of the device shown in Fig. 1 with parts of the same in section. Fig. 3 is a rear view of the device illustrated in Fig. 2, showing parts broken away to disclose internal mechanisms.

Like parts are designated by similar characters of reference throughout the different figures of the drawings.

My invention consists generally of a reciprocating bar $j$, provided on one end with a measuring-finger $h$ and on its opposite end with a pusher-knob $k$. Said bar has bearings in and is partially housed in a casing $a$, provided with graduated scales $r$ and $t$ and indicating-fingers $p$ and $s$. The lower end of said reciprocating bar, on which is mounted the measuring-finger, is inclosed in a tubular projection terminating in a contact-spider $g$. The indicator-housing $a$ and the spider $g$ are supported by an arm $b$, rising from a solid base, which is also provided with a horizontally-disposed arm $c$, having a bore extending throughout its vertical height. A bed-plate $e$, desirably circular in form, is provided with a spindle $d$, slidably mounted in said bore. Interposed between the bed-plate and the projecting arm $c$ is a coil-spring $f$, which is desirably wound about said spindle $d$ and serves normally to hold said bed-plate in engagement with the spider.

Next describing the indicator in detail the same desirably consists of indicating-fingers, one of which, $p$, is secured to the shaft of a pinion $o$, meshing with a pinion $n$. Said pinion $n$ is mounted on a shaft which also carries a rigidly-mounted pinion $m$, which meshes with a rack $l$, formed on the bar $j$. When the bar $j$ is reciprocated downwardly, the length of its travel is thus communicated to the indicating-fingers $p$ and $s$, which register the travel upon the graduated scales $r$ and $t$, and thereby indicate to the operator in millimeters or other suitable measuring systems the exact distance through which said bar has passed. A contractile spring $i$, secured at one end to the bar $j$, normally holds said bar in a retracted or, as shown, an elevated position, so that the lower point or end of the measuring-finger $h$ is normally in a horizontal plane with the lower face of the contact-spider. In this position the indicating-fingers $p$ and $s$ point to "zero" upon the graduated scale. In order that the retraction of said part to the above-described position may be insured after each measuring operation, the said measuring-finger $h$ is provided near its base or upper end with a shoulder, which engages an overhanging portion formed upon the spider, forming a stop limiting the upward movement of said bar. In order to prevent play of the pointers or fingers $p$ and $s$ in case of looseness between the rack $l$ and pinion $n$, and, further, to insure at all times the location of the indicating ends of the fingers normally adjacent the zero-marks on the graduated scales, I desirably provide a restoring-spring-actuated pinion $u$. Said pinion $u$ is actuated by a coil-spring $v$, having one end secured to a stationary part at $x$ and the opposite end secured to the shaft or to the pinion $u$, normally actuating the same in a contra-clockwise direction. Said pinion $u$ meshes with pinion $o$, and thereby communicates with the gearing of said pointers $p$ and $s$. It will thus be seen that the function of the spring $i$ is to hold the parts normally in a retracted position, while the function of the spring $v$ is to insure an accurate starting position of the fingers $p$ and $s$. Additional means are herein shown whereby downward reciprocation of the bar $j$ may be effected, which means consists, preferably, of a lever $y$, pivotally mounted at $z$ to a stationary part of the casing $a$. Said arm $y$ is provided with an upwardly and outwardly projecting arm 1, which is adapted when the outer end is elevated to engage with a pin 2 upon the bar $j$, thereby effecting downward reciprocation of the latter. A steadying-pin $j^3$, operating in a vertically-disposed slot $j^2$, serves to normally hold the bar $j$, so that its rack 1 will be at all times held in mesh engagement with the pinion $n$.

In the operation of ascertaining the depth of the recess or cavity in a hollow body, such as is indicated by 3, the bed-plate $e$ is reciprocated downwardly away from the contact-spider $g$ a sufficient distance to permit the interposition therebetween of said parts, as shown in Fig. 2. The spring $f$ normally acts upon the contact-plate $e$, holding the part 3 tightly engaged with said spider. The operator then grasps the knob $k$ or lever $y$, causing a downward reciprocation of the bar $j$ against the action of springs $i$ and $v$. As seen in Fig. 2, the measuring-finger $h$ will thus be engaged with the lower or bottom wall of cavity 4, and by observing the indicating-fingers $p$ and $s$ the operator is enabled quickly and accurately to determine the depth of said cavity. It will be noted that the spider $g$ comprises in the form shown three radially-extending arms, enabling the operator to clearly observe the measuring-finger and determine with which portion of the cavity it is engaged. The said arms offer an engaging area sufficiently large to insure an accurate location of the body to be measured with respect to the measuring-finger—that is, to insure its disposition in a plane at right angles to the operating plane of said finger. If instead of a single shallow recess the part 3 contained a number of recesses varying in depth, the open spaces between the arms of the contact-spider would enable the operator to clearly observe the parts and would facilitate the location of part 3 in a manner to bring the different recesses in register with the measuring-finger.

My invention possesses many advantages over the use of a simple graduated bar in ascertaining the depth of recesses or cavities. Since the latter cannot always be inserted in recesses of relatively restricted diameters and in recesses of relatively enlarged diameters, such graduating-bars cannot always be engaged with the lowermost surface or walls, because said bars are usually formed of material having a relatively extensive cross-sectional area compared to the end of a measuring-finger of the form shown. It is also impossible to accurately determine the depth of a recess when a graduated bar is used for the reason that it is necessary to cite the graduating line indicating the depth of the recess in a horizontal plane with the upper surface of the body in which the recess is formed, which must necessarily result in a very inaccurate calibration or measurement, especially when it is desired to secure measurements as fine as the hundredth part of a millimeter. In my improved device the measuring-finger is constructed with a relatively restricted cross-sectional area, enabling it not only to be inserted in small cavities or recesses, but also permitting its engagement with the lowermost surface therein. While I have herein shown and described a yieldingly-mounted bed-plate and a specific means for communicating to a particularly form graduated scale the length of travel of said measuring-finger, it will be obvious that these features may be very materially altered without departing from the spirit of the invention.

Therefore what I claim, and desire to secure by Letters Patent, is—

1. A measuring instrument comprising a reciprocating bar provided with a rack and a measuring-finger, a graduated scale, an indicating-finger geared to said rack, a stationary sleeve surrounding the lower end of said bar and terminating in projecting fingers forming a spider, a spring normally holding said bar in an elevated position to bring the lower end of the finger on a level with the spider, and a yieldingly-mounted plate normally engaging said spider.

2. A measuring instrument comprising a reciprocating bar, an indicating device operated by said bar, a stationary sleeve surrounding the lower end of said bar and terminating in projecting fingers forming a spider, and a yieldingly-mounted plate normally engaging said spider.

3. A measuring instrument comprising a reciprocating bar, an indicating device operatively connected therewith, a stationary contact member, and a yieldingly-mounted support normally engaging said member.

In testimony whereof I have signed my name to this specification in the presence of two subscribing witnesses.

MAURICE PICARD.

Witnesses:
ARMAND PERRELET,
PHILIPPE BÉGUIN.